US007455439B2

(12) United States Patent

Albou et al.

(10) Patent No.: US 7,455,439 B2

(45) Date of Patent: Nov. 25, 2008

(54) ELLIPTICAL HEADLIGHT EQUIPPED WITH AN OCCULTING SCREEN OF TRANSPARENT MATERIAL

(75) Inventors: Pierre Albou, Bobigny (FR); Boris Wiegand, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 260 days.

(21) Appl. No.: 11/054,231

(22) Filed: Feb. 9, 2005

(65) Prior Publication Data

US 2005/0180154 A1 Aug. 18, 2005

(30) Foreign Application Priority Data

Feb. 13, 2004 (FR) .................................. 04 01490

(51) Int. Cl.
*B60Q 1/00* (2006.01)

(52) U.S. Cl. ....................... 362/539; 362/297; 362/351; 362/510; 362/538

(58) Field of Classification Search ................. 362/351, 362/510, 538, 539, 297
See application file for complete search history.

(56) References Cited

U.S. PATENT DOCUMENTS 4,868,726 A * 9/1989 Segoshi ...................... 362/308
5,967,647 A * 10/1999 Eichler ....................... 362/304
6,312,147 B2 * 11/2001 Eichler ....................... 362/539
6,354,721 B1 * 3/2002 Zattoni ....................... 362/513
6,543,910 B2 * 4/2003 Taniuchi et al. ............. 362/297
7,036,969 B2 * 5/2006 Foust et al. ................. 362/539

FOREIGN PATENT DOCUMENTS

FR 2537249 6/1984
FR 2787864 6/2000
FR 2815310 6/2002
FR 2831497 5/2003

OTHER PUBLICATIONS

French Search Report dated Aug. 25, 2004.

* cited by examiner

*Primary Examiner*—Sandra O'Shea
*Assistant Examiner*—James W Cranson, Jr.
(74) *Attorney, Agent, or Firm*—Morgan & Finnegan LLP

(57) ABSTRACT

A headlight of the elliptical type comprises an occulting or masking screen which defines a cut-off profile in the light beam emitted by a light source, the beam being a regulation lighting beam for use in wet weather, with a cut-off profile. This beam includes a zone of reduced illumination which is situated below the cut-off line. The occulting screen includes at least one generally transverse portion which is made of transparent material and which lies above the cut-off line. This transparent portion includes a zone of reduced transparency which forms the zone of reduced illumination within the regulation lighting beam.

12 Claims, 2 Drawing Sheets

ELLIPTICAL HEADLIGHT EQUIPPED WITH AN OCCULTING SCREEN OF TRANSPARENT MATERIAL

FIELD OF THE INVENTION

The present invention relates to a headlight of the elliptical type for a motor vehicle. More particularly, the present invention relates to a headlight for a motor vehicle, comprising a light source, a reflector of the elliptical type, a first focus of which is situated in the vicinity of the light source, a convergent lens having a focal plane which passes close to a second focus of the reflector, and a masking or occulting screen which is interposed axially between the reflector and the lens on the longitudinal optical axis of the headlight, and which delimits a cut-off profile in the light beam emitted by the light source, whereby to produce, for illumination in wet weather, a regulation beam comprising a zone of reduced illumination which is situated below the cut-off line.

BACKGROUND OF THE INVENTION

In an elliptical headlight, also referred to as a headlight with optical imaging, the occulting or masking screen constitutes a diaphragm, one edge of which defines the cut-off profile which is reproduced to infinity in front of the vehicle, by the objective, which in this case consists of the lens, whereby to form an illuminating beam which includes a cut-off in a form which corresponds to the cut-off profile.

The diaphragm reproduced, or imaged, by the objective enables an obscurity/clarity limit to be obtained, the form of this limit being fully defined according to requirements, with a high degree of clarity or a desired amount of fuzziness.

Recent legislation has made it necessary to apply improvements to elliptical headlights of conventional types, such that they are able to form specific illuminating beams which are adapted to prevailing travelling conditions, for example either a regulation lighting beam for use in wet weather, which is referred to as "adverse weather lighting" (AWL) or a "rain beam", or a regulation lighting beam for town driving, or else a regulation lighting beam for motorway (thruway) driving, and so on. The regulation lighting beam for use in wet weather has the particular feature that it includes a cut-off profile identical to that of a regulation dipped or passing beam, and it includes a zone of reduced illumination which is situated below the cut-off line and within the lighting beam.

In this connection, for this type of beam the legislation calls for a reduction in the amount of illumination below the cut-off profile and to the left (in the case where the vehicle is to be driven on the right hand side of the road) of the longitudinal axis of the vehicle.

The zone of reduced illumination is intended to prevent drivers travelling in the opposite direction being dazzled by light reflected off the left hand side of the road between the two vehicles driving in opposite directions, such reflections being due to the road being wet.

Elliptical headlights have previously been proposed for forming a regulation lighting beam of this kind for use in wet weather.

In the document FR-A-2 831 497, it was proposed to arrange a transverse tongue in front of the focal plane of the lens, in such a way that it would be de-focussed with respect to the lens, and so that it forms in the lighting beam a zone of reduced illumination with a relatively fuzzy contour.

This solution is not entirely satisfactory, because the tongue completely masks part of the light rays, so that the zone of reduced illumination has the appearance of a dark patch within the lighting beam. This dark patch may be worrying to the driver of the vehicle in which the headlight is mounted.

In addition, it is difficult to control the influence of the tongue on the light rays of the lighting beam, and this can give rise to unwanted variations in the distribution of light within the beam.

Moreover, the elliptical headlight is generally arranged to produce a plurality of regulation light beams, in particular a conventional dipped or passing beam, since the lighting beam for wet weather corresponds to only one particular travelling situation.

To this end, the elliptical headlight is provided with at least one occulting or masking screen which is movable to a plurality of positions corresponding to a plurality of regulation lighting beams, one of which is the wet weather or rain beam.

In the document FR-A-2 831 497, a masking screen is arranged to tilt about a horizontal transverse axis between an occulting position and a retracted position. This screen includes a cut-off profile corresponding to a regulation passing beam, and also a transverse tongue which is designed to define the zone of reduced illumination corresponding to the rain beam.

The tongue is fixed on the front face of the screen, and it extends vertically upwards. In consequence, it forms in the lighting beam a zone of reduced lighting which extends as far as the cut-off line.

The lighting beam obtained is not entirely satisfactory because the tongue adversely affects the quality of the lighting beam close to the cut-off line.

Another disadvantage of the unfocussed tongue is that it creates an imbalance on the moving screen. The presence of this imbalance is particularly detrimental in a headlight which includes a drum member mounted for rotation about an axis which is inclined in the horizontal plane, such as the conical drum which is described in French published patent document FR-A-2 815 310.

In this connection, the out of balance effect produced by the unfocussed tongue on the pivoting member may be a source of vibrations within the headlight, and it can give rise to premature wear of the motor that drives the drum.

In consequence, this solution is not fully satisfactory, and may give rise to problems of operational reliability of the headlight.

In addition, the presence of the unfocussed tongue may give rise to size problems within the headlight, and in particular mechanical interferences, as a function of the various angular positions occupied by the occulting screen.

OBJECT OF THE INVENTION

The invention aims to provide a remedy for the above mentioned drawbacks, by proposing a simple, effective and inexpensive solution.

DISCUSSION OF THE INVENTION

With this object in view, the invention proposes a headlight of the type described above under "Field of the Invention", which is characterised in that the masking screen includes at least one generally transverse portion which is formed of transparent material that lies above the cut-off profile, and in that the said transparent portion of the masking screen includes a zone of reduced transparency which forms the zone of reduced illumination in the regulation lighting beam.

According to various preferred further features of the invention, which may be adopted for a headlight according to the invention singly or in any technically feasible combination of two or more features:

- the zone of reduced transparency comprises a deposit of opaque material on at least one transverse face of the transparent portion;
- the zone of reduced transparency is formed by localised surface treatment applied on at least one transverse face of the transparent portion;
- the masking screen is formed entirely of transparent material, and includes a main occulting portion formed by deposition of a layer of opaque material on at least one of its transverse faces;
- the main occulting portion comprises a layer of opaque material applied on both the transverse faces of the masking screen;
- the transparent portion extends generally in width over the whole length of the cut-off line, and extends generally in height up to the upper limit of the usable focal zone, so that the greater part of the non-occulted light beam has to pass through the transparent portion;
- the masking screen is movable between a working position, in which the screen occults part of the light rays emitted by the light source, whereby the headlight emits a regulation beam for lighting in wet weather, and a retracted position, in which the headlight emits another regulation lighting beam;
- the headlight includes a fixed occulting screen or so-called mask, which co-operates with the movable screen in the working position, whereby to form the regulation lighting beam for wet weather;
- the masking screen is mounted for pivoting movement about an axis which is contained generally within a longitudinal plane, and the pivot axis extends in a direction which is inclined with respect to the vertical by an angle lying generally in the range between zero and 45 degrees;
- the masking screen includes a plurality of cut-off profiles which are substantially adjacent to each other and which correspond to a plurality of respective regulation lighting beams;
- the masking screen is made in one piece in a transparent material, and it is generally in the form of an angular sector of a tube centred on the pivot axis;
- the transparent material is glass.

Further features and advantages of the invention will appear on a reading of the following detailed description, for an understanding of which reference will be made to the attached drawings.

DESCRIPTION OF A PREFERRED EMBODIMENT OF THE INVENTION

For the following description of a preferred embodiment of the invention, the convention will be adopted, but without limitation, whereby the vertical, longitudinal and transverse orientations are those indicated by the axes V, L and T respectively.

Also in this description, those elements which are identical, similar or analogous to each other will be designated by the same reference signs.

Figure 1:
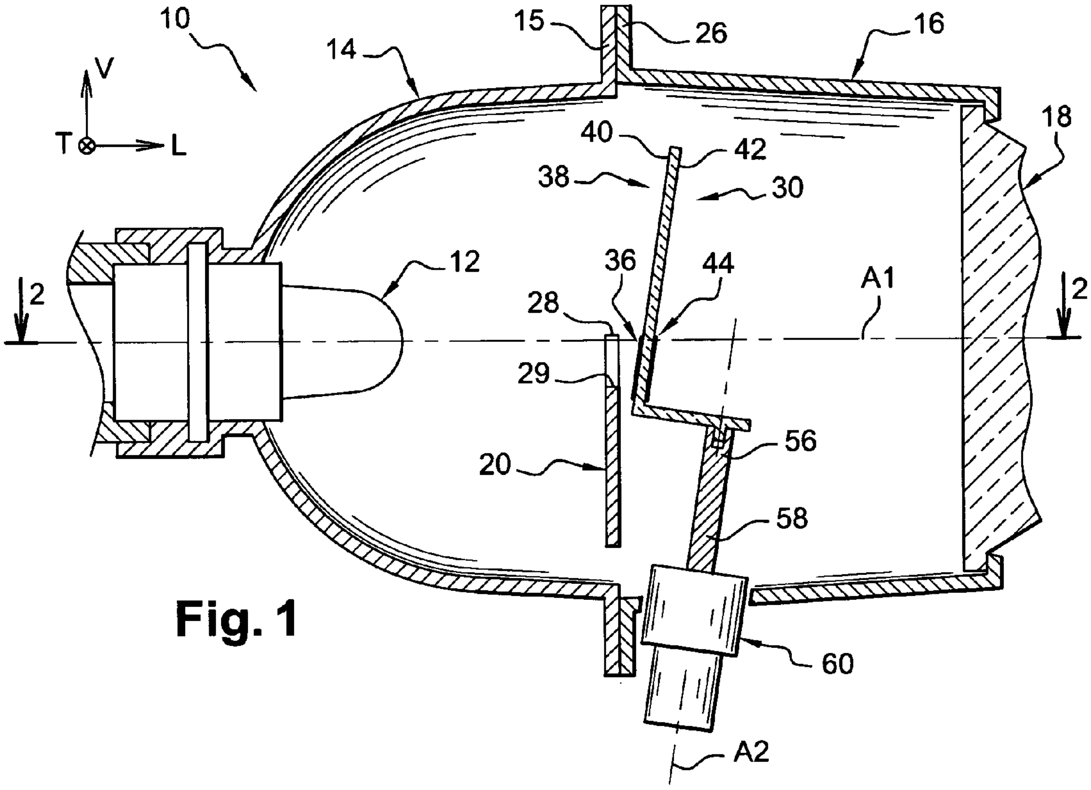
FIG. 1 is a view in cross section taken on the plane of cross section 1—1 in FIG. 2, and shows diagrammatically an elliptical headlight equipped with a masking screen in accordance with the features of the invention.
Figure 2:
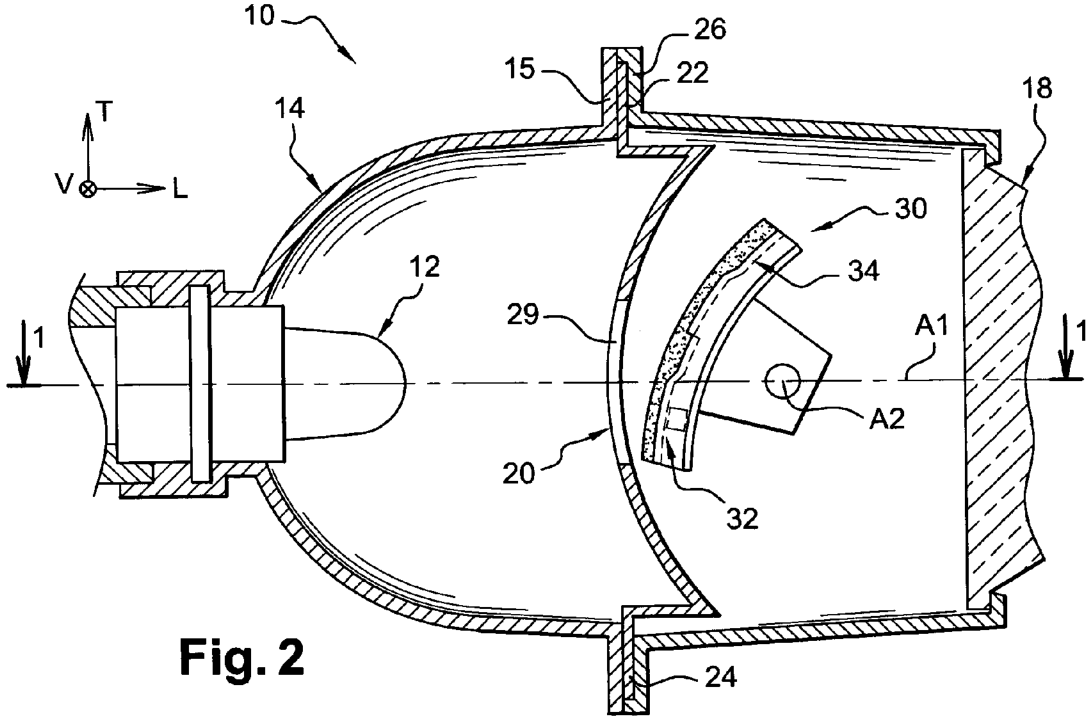
FIG. 2 is a view taken partly in the plane of cross section 2—2 in FIG. 1, with the masking screen occupying a first angular position.

FIGS. 1 and 2 show a headlight 10 for a motor vehicle, made in accordance with the features of the invention.

In the conventional way, the headlight 10 includes a light source 12 and an elliptical reflector 14. The light source 12 is arranged generally at the first focus of the elliptical reflector 14. In this example, but without any limitation, a longitudinal optical axis A1 is defined and is oriented from the rear towards the front in the lighting direction of the headlight 10, which corresponds to an orientation from left to right with respect to FIG. 1.

The headlight 10 includes, at the front, a lens carrier 16 which is fixed on the front peripheral terminal axial edge 15 of the reflector 14. A convergent lens 18 is mounted in the aperture defined at the front axial end of the lens carrier 16.

Part of the lens 18 is shown in the drawings. The focal plane of the lens 18 lies generally in the vicinity of a second focus of the reflector 14. The reflector 14 and lens carrier 16 in this example together constitute a body of the headlight 10.

The headlight 10 may also include a casing (not shown), which encloses the said body and which can be protected by a protective cover glass, not shown.

The headlight 10 includes a fixed screen which will be called the mask 20, and which is in the form of a curved plate. The mask 20 is fixed rigidly to the body, in this example by means of two transverse fastening lugs 22 and 24. Each fastening lug 22, 24 in this example is gripped axially between a portion of the front peripheral edge 15 of the reflector 14 and a portion of the facing peripheral edge 26 of the lens carrier 16.

The mask 20 has a vertical generatrix in the form of a circular arc, the centre of curvature of which is arranged on the optical axis A1 in front of the headlight 10. The curved profile of the mask 20 in horizontal axial cross section generally follows the field curvature of the lens 18, while the mask 20 lies close to the focal plane of the lens 18.

The mask 20 preferably extends over the whole transverse width of the reflector 14, and it extends vertically mainly in the lower half of the reflector 14.

The upper edge 28 of the mask 20 is formed with a cut-out 29 centred on the optical axis A1, and the transverse width of this cut-out corresponds generally to the transverse width of the usable focal zone, i.e. the focal zone made use of for forming the lighting beams.

The substantially horizontal upper edge of the cut-out 29 of the mask 20 lies at a predetermined vertical distance below the optical axis A1, so that the mask 20 occults, or obturates, the majority of the light rays emitted in the reflector 14 below the optical axis A1, and while allowing some of these light rays to pass between the upper edge of the cut-out 29 and the optical axis A1.

In the usual way, the headlight 10 includes a masking or occulting screen 30 which is interposed axially, with reference to the longitudinal optical axis A1, between the reflector 14 and lens 18, and which delimits at least one cut-off profile 32, 34 in the light beam emitted by the source 12, so as to produce a regulation beam for illumination in wet weather, or so-called rain beam, Fp.

The masking screen 30 is arranged in front of the mask 20, so that it lies at least partly in the focal plane of the lens 18.

The masking screen 30 and mask 20 are arranged to cooperate together to form the rain beam Fp. To this end, the masking screen 30 is arranged to occult selectively a part of the light rays emitted above the upper edge of the cut-off 29 in the mask 20.

In the embodiment shown here, the masking screen 30 defines two cut-off profiles 32 and 34, adjacent to each other, which correspond respectively to two regulation lighting beams, which in this example are a rain beam Fp and a dipped or passing beam Fc.

In addition, the masking screen 30 is mounted for pivoting movement about an axis A2, which lies generally in a vertical longitudinal plane and which is slightly inclined with respect to the vertical direction by an angle of between zero and 45 degrees.

The masking screen 30 in this example pivots between a first angular position which is shown in FIG. 2, in which the headlight 10 forms the rain beam Fp, and a second angular position in which the headlight 10 is producing the passing beam Fc.

In accordance with the features of the invention, the masking screen 30 is made of transparent material. The masking screen 30 is generally in the form of a curved transparent strip having a generatrix following the pivot axis A2, which is in the form of an arc of a circle such that the curvature of the screen 30 generally follows the field curvature of the lens 18.

The masking screen 30 has an occulting lower portion 36 and an upper portion 38 which allows the light beams emitted by the source 12 to pass through it.

The occulting lower portion 38 is made in this example by deposition of an opaque material, for example aluminium, on at least one generally transverse face 40 or 42 of the screen 30. Preferably, the opaque material is deposited on both of the generally transverse faces 40 and 42 of the screen 30.

In the present example, the convex and concave faces of the occulting screen 30 are referred to as the rear transverse face 40 and front transverse face 42 of the masking screen 30, even though the said faces 40 and 42 are not in practice strictly transverse to the optical axis A1.

The upper edge 44 of the occulting portion 36 traces the two cut-off profiles 32 and 34 of the light beams Fp and Fc associated with the screen 30.

In the present case, a part of the occulting portion 36 lies below the height of the upper edge of the cut-out 29 in the mask 20, so that no light ray is able to reach the lens 18 by passing between the upper edge of the cut-out 29 and the lower edge of the occulting portion 36.

The upper edge 38 of the masking screen 30 extends generally vertically to the summit of the usable focal zone, with respect to the lens 18, in such a way that all of the light rays that constitute the lighting beam projected by the lens 18 pass through the transparent upper portion 38 of the screen.

Figure 3:
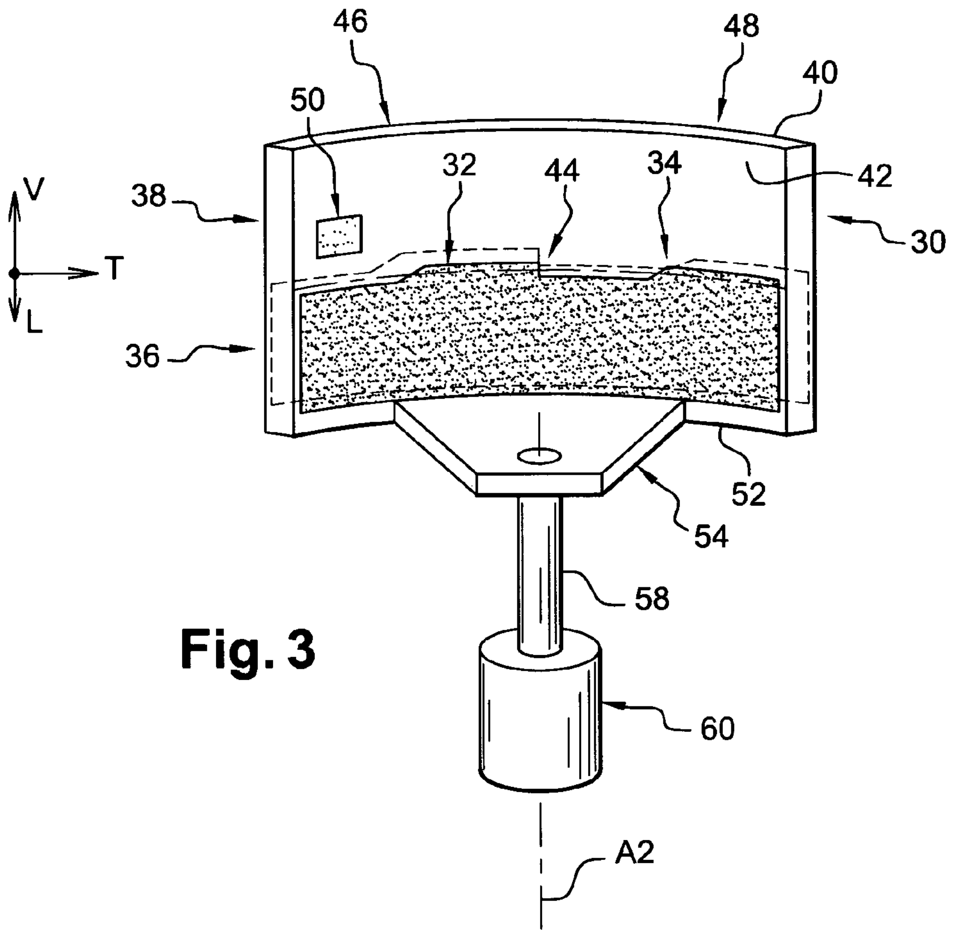
FIG. 3 is a front view showing the masking screen of FIG. 1 diagrammatically.

With reference now in particular to FIG. 3, it is found that the masking screen 30 can be divided geometrically into two angular sectors 46 and 48 in relation to the pivot axis A2, which have substantially the same circumferential dimension.

A first angular sector 46 includes the cut-off profile 32 corresponding to the rain beam Fp, while the second angular sector 48 includes the cut-off profile 34 which corresponds to the passing beam Fc.

In the first angular position which is shown in FIG. 2, the cut-off profile 32 of the first angular sector 46 is substantially centred on the optical axis A1.

The first angular position corresponds to a so-called active position of the first angular sector 46, and to a so-called retracted position of the second angular sector 48, and the headlight 10 produces the rain beam Fp.

In accordance with the features of the invention, in order to be able to produce a rain beam Fp when the masking screen 30 is in its first angular position, the first angular sector 46 includes a zone 50 of reduced transparency which is arranged to form a zone of reduced illumination Z within the rain beam Fp.

The reduced transparency zone 50 is preferably arranged on the front face 42 of the first angular sector 46, above the first cut-off profile 32.

Preferably, the zone 50 of reduced transparency is formed by deposition of an opaque material, for example of the same kind as that which is used to form the occulting lower portion 36 of the mask, and having a density which is determined to be such that it allows part of the light rays to pass through it so as to reach the zone of reduced transparency 50. The density of the opaque material present in the zone 50 of reduced transparency must therefore be smaller than the density of opaque material arranged in the occulting portion 36.

Figure 4:
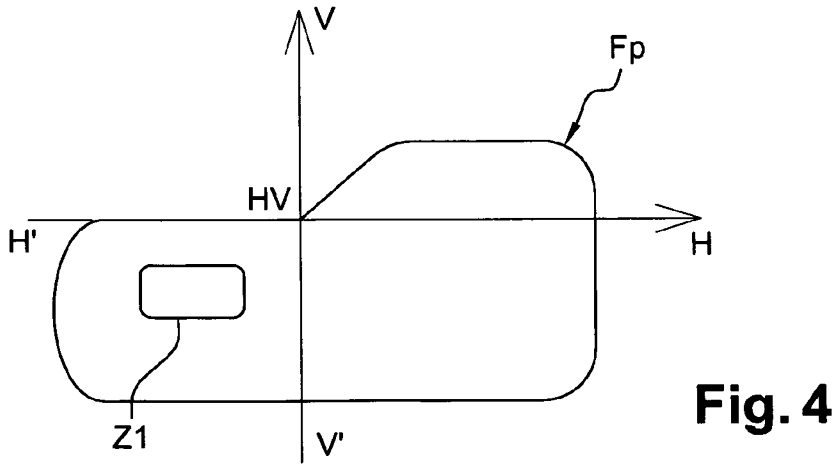
FIG. 4 is a diagram showing a regulation light beam produced by the headlight of FIG. 1, for providing illumination in wet weather.

Thus, and as is illustrated in FIG. 4, the zone 50 of reduced transparency forms a zone Z1 in the rain beam Fp, giving an intensity of illumination which is lower than the illumination of adjacent zones, but without producing a shadow zone extending as far as the cut-off line.

The second angular sector 48 of the masking screen 30 has a cut-off profile 34 corresponding to a cut-off beam Fc. By contrast with the first angular sector 46, it therefore does not have any zone of reduced transparency.

In the second angular position, the cut-off profile 34 of the second angular sector 46 is substantially centred on the optical axis A1. The second angular position corresponds to a so-called active position of the second angular sector 48 and to a so-called retracted position of the first angular sector 46, with the headlight 10 emitting the passing beam Fc.

The masking screen 30 in this example is provided with a fastening plate 54 at its lower end 52, the plate 54 lying in a radial plane with respect to the pivot axis A2 and being fixed on the free upper end 56 of the drive shaft 58 of an electric motor 60. In this example, the drive shaft 58 defines the pivot axis A2 of the masking screen 30.

The fastening plate 56 is preferably made in one piece with the masking screen 30.

By controlling the pivoting movement of the masking screen 30 towards one of its two predetermined angular positions, the headlight 10 is able to produce either a rain beam Fp or a passing beam Fc.

The arrangement of the zone 50 of reduced transparency on the front face 42 of the screen 30 enables the zone 50 of reduced transparency to be shifted forward, by the thickness of the screen 30, with respect to the focal plane of the lens 18 which is situated close to the rear face 40 of the screen 30, so that the zone 50 of reduced transparency is de-focalised, and so that it creates a zone Z1 of reduced illumination, with a fuzzy edge. This enables a relatively progressive transition of the lighting intensity to be obtained between the zone of reduced illumination and the adjacent zone of the beam Fp in which the intensity of illumination is higher.

The zone 50 of reduced transparency in accordance with the invention enables the photometric characteristics of the rain beam Fp to be controlled with precision and ease.

In this connection, it is possible to control the quantity of light which is emitted towards the zone Z1 of reduced illumination, for example by choosing the density and/or the thickness of the opaque material which is deposited in the zone 50 of reduced transparency, and/or by applying, in the zone 50 of reduced transparency, motifs of opaque material which still partially allow light to pass through.

It is also possible easily to control the form and location of the zone Z1 of reduced illumination in the rain beam Fp, which depends directly on the form and location of the zone 50 of reduced transparency.

It is not essential that the opaque material be deposited on each of the faces 40 and 42 of the masking screen 30, in order to form the occulting lower portion of the screen. However, the deposit of opaque material on the two faces 40 and 42 does reduce the effect of chromatic aberration in the cut-off, that is to say the presence of coloured light in the vicinity of the cut-off line in the lighting beam Fp or Fc, which is due to the axial offset of the focal plane of the lens 18 following the wavelength of the light rays concerned.

The zone 50 of reduced transparency can itself, of course, also be formed by deposition of opaque material on the two faces 40 and 42 of the masking screen, so as to limit its chromatic effects, especially on the perimeter of the zone 50 of reduced transparency.

The layer of opaque material can consist of a metallic deposit, for example based on aluminium, or an ink deposit.

The zone 50 of reduced transparency may consist of a substantially uniform deposit, or an array of points or motifs of small dimensions.

In a modified embodiment (not shown), the zone 50 of reduced transparency may be formed by treatment of the surface of the transparent material of which the masking screen 30 is made, for example by de-polishing it, or by forming raised pips or hollows on it. The surface treatment may enable the photometry of the rain beam Fp to be optimised by diverting the light rays received through the zone 50 of reduced transparency towards a rain beam zone Fp which necessitates a higher light intensity.

The invention is of course applicable to other types of masking screens (not shown), especially a masking screen which tilts about a substantially transverse axis, such as those described in the document FR-A-2 831 497, or again a masking screen in the form of a transverse disc with an optical axis A1, which is mounted for pivoting movement about a longitudinal axis.

In a further modified embodiment (not shown), the masking screen may be limited in height to the height of the cut-off edges 32 and 34. In that case, it includes a transparent portion in the form of a tooth or a transverse vertical tongue, which extends upwards from the cut-off edge 32 corresponding to the rain beam Fp. The free end of this transparent portion then comprises the deposit of opaque material which forms the zone 50 of reduced transparency.

In this modified version, the tooth-shaped transparent portion may be made of semi-transparent ceramic.

The advantage of a masking screen 30 which includes a transparent upper portion through which all of the light rays constituting the illuminating beam pass, is the avoidance of the presence of parasitic images of the edges of the transparent portion.

The masking screen 30 may be made of toughened glass, or of a special mixture of glass suitable for withstanding the stresses occurring during operation of the headlight 10, especially as regards those due to vibration and temperature changes.

The masking screen 30 may also be made of "porous glass", that is to say a type of glass which is obtained from a silica gel and which contains voids which reduce its volumetric mass. In particular, such a type of material enables the mass of the masking screen 30 to be reduced, and therefore its inertia, and it enables a reduction to be obtained in losses of light by vitreous reflection, due to the low refractive index of this material.

The inclination of the pivot axis A2 with respect to a vertical position enables the size of the masking screen 30 to be limited within the headlight 10. In addition, because of this inclination, the angular sector 46 or 48 that occupies its retracted position is lower down than the angular sector 46 or 48 which occupies its active or working position, so that the angular sector 46 or 48 which is retracted is below the path of the light rays that constitute the lighting beam Fp or Fc.

The invention has been described with a masking screen 30 which has two cut-off profiles 32 and 34. The invention is of course also applicable to a headlight 10 which is equipped with a masking screen 30 having only one cut-off profile, or more than two cut-off profiles.

What is claimed is:

1. A headlight for a motor vehicle, comprising a light source, a reflector of the elliptical type, a first focus or which is situated in the vicinity of the light source, a convergent lens having a focal plane which passes close to a second focus of the reflector, and a masking or occulting screen which is interposed axially between the reflector and the lens on the longitudinal axis of the headlight, and which delimits a cut-off profile in the light beam emitted by the light source, whereby to produce, for illumination in wet weather, a regulation beam comprising a zone of reduced illumination which is situated below the cut-off profile, wherein the masking screen includes at least one generally transverse portion which is formed of transparent material that lies above the cut-off profile, and wherein the said transparent portion of the masking screen includes a zone of reduced transparency which forms the zone of reduced illumination in the regulation lighting beam.

2. A headlight according to claim 1, wherein the zone of reduced transparency is defined by a zone of opaque material deposited on at least one transverse face of the transparent portion.

3. A headlight accordingly claim 1, wherein the zone of reduced transparency is formed by a localised surface treatment applied on at least one transverse face of the transparent portion.

4. A headlight accordingly to claim 1, where in the masking screen is formed entirely of transparent material, and includes a main occulting portion formed by deposition of layer of opaque material on at least one of its transverse.

5. A headlight accordingly to claim 4, wherein the main occulting portion comprises a layer of opaque material applied on both the transverse faces of the masking screen.

6. A headlight accordingly to preceding claim 1, wherein the transparent portion extends in width over generally the whole length of the cut-off line, and extends in height generally up to the upper limit of the useable focal zone, so that the greater part of the non-occulted light beam has to pass through the transparent portion.

7. A headlight according to claim 1, wherein the masking screen is movable between a working position, in which the screen occults part of the light rays emitted by the light source, whereby the headlight emits a regulation beam for light in wet weather, and a retracted position, in which the headlight emits another regulation lighting beam.

8. A headlight accordingly claim 7, further including a fixed occulting screen which co-operates with the movable screen in the working position, whereby to form a said regulation beam for wet weather.

9. A headlight accordingly to claim 7, wherein the masking screen is mounted for pivoting movement about a pivot axis which is contained generally within a longitudinal plane, and in that the pivot axis extends in a direction which is inclined with respect to the vertical by an angle lying generally in the range between zero and 45 degrees.

10. A headlight according to claim 9, wherein the masking screen includes a plurality of cut-off profiles which are substantially adjacent to each other and which correspond to a plurality of respective regulation lighting beams.

11. A headlight accordingly to claim 10, the masking screen is formed entirely of transparent material, and includes a main occulting portion formed by deposition of a layer of opaque material on at least one of the transverse faces, and wherein the masking screen is made in one piece in a transparent material, being generally in the form of an angular sector of a tube centred on a pivot axis.

12. A headlight accordingly to claim 1, wherein the transparent material is glass.

* * * * *

UNITED STATES PATENT AND TRADEMARK OFFICE

CERTIFICATE OF CORRECTION

PATENT NO. : 7,455,439 B2
APPLICATION NO. : 11/054231
DATED : November 25, 2008
INVENTOR(S) : Pierre Albou et al.

It is certified that error appears in the above-identified patent and that said Letters Patent is hereby corrected as shown below:

Column 8, line 45, change “accordingly to claim 1” to --according to claim 1--;

Column 8, line 49, change “accordingly to claim 1, where in” to --according to claim 1, wherein--;

Column 8, line 53, change “accordingly to claim 4” to --according to claim 4--;

Column 8, line 56, change “accordingly to preceding claim 1” to --according to preceding claim 1--;

Column 9, line 1, change “accordingly to claim 7” to --according to claim 7--;

Column 9, line 6, change “accordingly to claim 7” to --according to claim 7--;

Column 10, line 3, change “accordingly to claim 10” to --according to claim 10--; and Column 10, line 10, change “accordingly to claim 1” to --according to claim 1--.

Signed and Sealed this

Twenty-third Day of June, 2009

JOHN DOLL
*Acting Director of the United States Patent and Trademark Office*